No. 777,629. PATENTED DEC. 13, 1904.
A. HAUG.
PROCESS OF MAKING PHONOGRAPH CYLINDERS.
APPLICATION FILED OCT. 6, 1902.
NO MODEL.
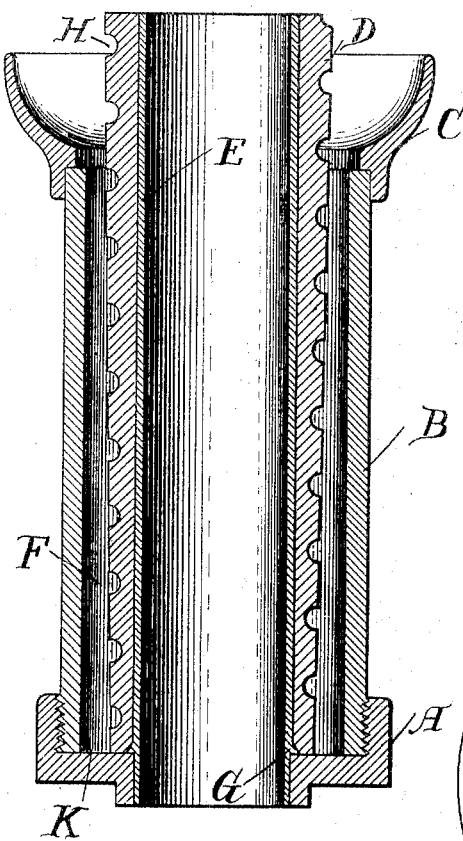
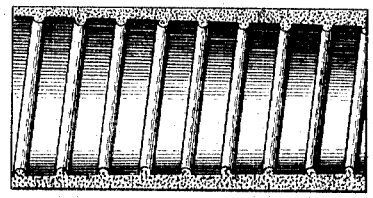
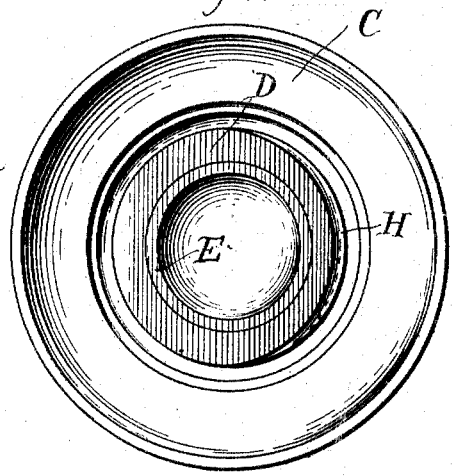
Witnesses
Grace A. Grimmond
Geo. W. Buckley
Andrew Haug
Inventor
By his Attorney
Louis Hicks No. 777,629.

Patented December 13, 1904.

UNITED STATES PATENT OFFICE.

ANDREW HAUG, OF WEST ORANGE, NEW JERSEY.

PROCESS OF MAKING PHONOGRAPH-CYLINDERS.

SPECIFICATION forming part of Letters Patent No. 777,629, dated December 13, 1904.

Application filed October 6, 1902. Serial No. 126,080. (No model.)

*To all whom it may concern:*

Be it known that I, ANDREW HAUG, a citizen of the United States, residing at West Orange, in the county of Essex and State of New Jersey, have invented new and useful Improvements in the Manufacture of Phonograms and in Phonograms, of which the following is a specification.

This invention relates to the process of manufacturing phonograms by molding and to phonograms thus manufactured, and has for its object to render the process more expeditious and cheaper and the phonogram thus manufactured better.

Heretofore in the manufacture of phonograms by molding heat and cold have not been applied by immersion of the mold at the inner surface of the phonogram, and when the phonogram, which is cylindrical in shape and hollow, has been taken from the mold it has heretofore been necessary to place it upon a reamer in order to shape, to finish or dress, and to give the proper size to the bore of the phonogram-cylinder, especially for the purpose of causing it to fit upon the mandrel of the phonograph.

I have discovered that in the manufacture of phonograms, by the application of heat and cold by immersion of the mold at the inner surface of the phonogram-cylinder during the process of manufacture by molding, a hollow cylindrical phonogram can be more quickly and more economically produced having a bore of proper shape and of proper size and of finished surface which will fit upon the mandrel of the phonograph and that heat and cold can be applied at the inner surface of the phonogram-cylinder during the process of manufacture by molding by the following method, illustrated in the drawings, which gives very satisfactory results.

Figure 1 represents a vertical section of a mold for casting phonogram-cylinders according to my invention. Fig. 2 shows the inner surface of a phonogram molded according to my process. Fig. 3 is a top view of the mold shown in Fig. 1.

The bottom piece A is the base of the mold. B is a hollow cylinder which is screwed into the base A.

C is a rim which sets on the tube or cylinder B.

D is the core of the mold and is hollow. The core D is preferably recessed at the bottom, as at G, in order to make the parts at that point fit tightly and prevent the heated liquid wax from entering between the core D and the inner tube E, which projects into the recess at G. Into the ring of the base A of the mold the hollow cylindrical inner tube E fits and serves to guide the core D when it is inserted into or withdrawn from the other parts of the mold and to keep the core D when inserted and in place concentric with the outer cylinder B. On the outer surface of the core D there is preferably a spiral groove H or other hollow for the formation of ribs or projections upon the inner surface of the molded phonogram.

F is the matrix or cavity of the mold into which the molten material from which the phonogram is to be molded enters. The outer surface of the matrix F is cylindrical; but the inner surface of the matrix F is preferably tapering like the surface of a cone.

An important feature of the mold shown in Fig. 1 and of my invention is that the core D and the cylinder E are hollow, thereby permitting the entrance by immersion of the mold of a medium for the application of heat or cold at the inner surface of the phonogram-cylinder during the process of manufacture by molding. The core D is preferably higher than the cylinder B. The lower end K of the matrix F may be so shaped that the phonogram when molded will have at that end the shape desired. Upon the inner surface L of the cylinder B a metallic negative of a phonograph-record to be reproduced upon the phonogram to be molded may be placed.

The parts of the mold are made of brass or other suitable material.

In the manufacture of phonograms according to the process of my invention the mold above described and shown in Fig. 1 may be lowered into the molten wax or other material from which the phonogram is to be molded until the molten material pours over the rim C into the matrix F and fills the cavity to the desired height. A surplus of molten material is preferably permitted to enter the rim C in order that it may make up for shrinkage of the molten material in the matrix F upon cooling. As the mold is lowered, as above described, into the molten material to permit the molten material to pour into the matrix F the molten material rises in the hollow cylinder E within the core D and communicates its heat through the cylinder E and the core D to the inner surface of the molten material filling the matrix F just as the molten material through the cylinder B communicates its heat to the outer surface of the molten material filling the matrix F. The result of heating the inner surface of the molten material filling the matrix F is to make and keep the molten material thoroughly liquid and enable it to penetrate and fill completely the space of the matrix. By the method described the heating is quickly accomplished.

In order to cool off the mold and the molten material in the matrix F, the mold is now lowered into cold water or other suitable cooling material. Since the water rises in the hollow cylinder E as the mold is lowered into the water, cold is quickly communicated to the inner surface of the molten material filling the matrix F just as it is communicated to the outer surface. The result is that the molten material filling the matrix F cools quickly and the core D can be extracted from the bore of the molded phonogram, leaving a bore of proper shape and of proper size and of finished surface which will fit upon the mandrel of the phonograph.

What I claim is—

1. The process of making phonograph-cylinders that consists of introducing molten material into a mold having a hollow core, and applying heat to the inner surface of said core, substantially as described.

2. The process of making phonograph-cylinders that consists of introducing molten material into a mold having a hollow core, and applying heat to the inner surface of said core by immersion of the mold, substantially as described.

3. The process of making phonograph-cylinders that consists of introducing molten material into a mold having a hollow core, and applying heat and cold successively to the inner surface of said core, substantially as described.

4. The process of making phonograph-cylinders that consists of introducing molten material into a mold having a hollow core, and applying heat and cold successively to the inner surface of said core by immersion of the mold, substantially as described.

In testimony whereof I have signed my name to this specification, this 30th day of September, 1902, in the presence of two subscribing witnesses.

ANDREW HAUG.

Witnesses:
DANIEL A. DUGAN,
EDWIN FORREST.